March 27, 1962     A. F. GARBARINO     3,027,174
NESTING PLATFORM TRUCKS
Filed Sept. 27, 1960     2 Sheets-Sheet 1
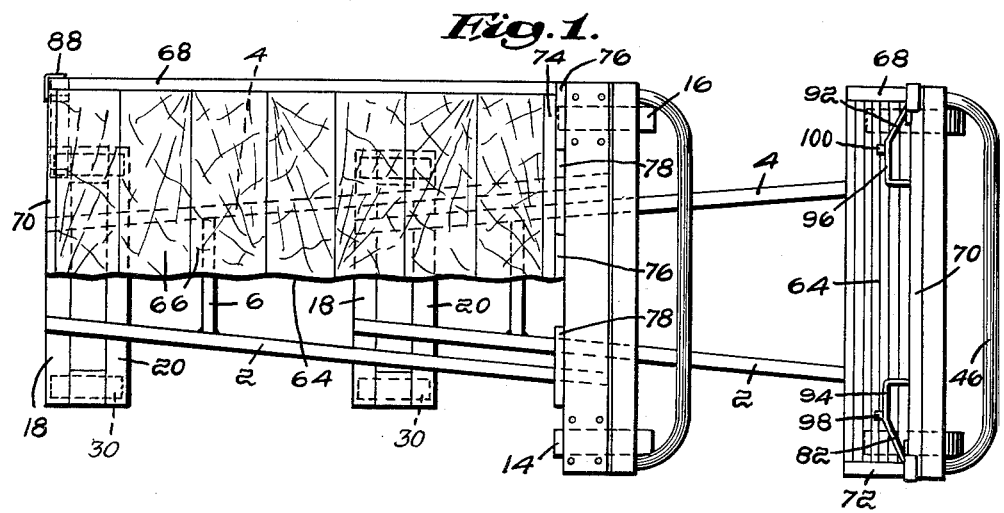
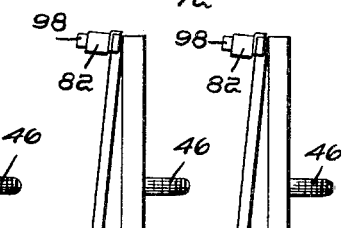
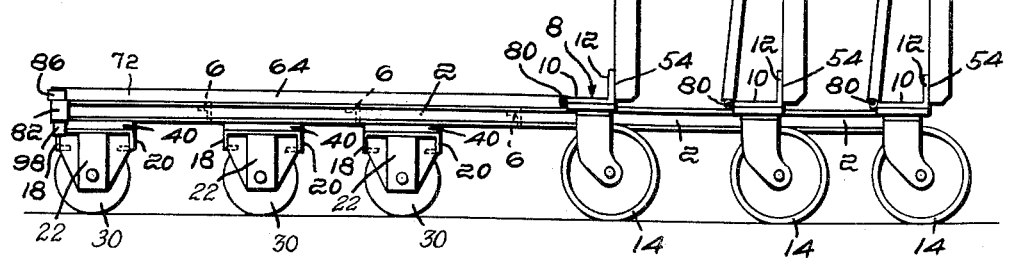
Inventor:
Americo Frank Garbarino,
by Porter, Chittick & Russell
Attorneys March 27, 1962     A. F. GARBARINO     3,027,174
NESTING PLATFORM TRUCKS
Filed Sept. 27, 1960     2 Sheets-Sheet 2
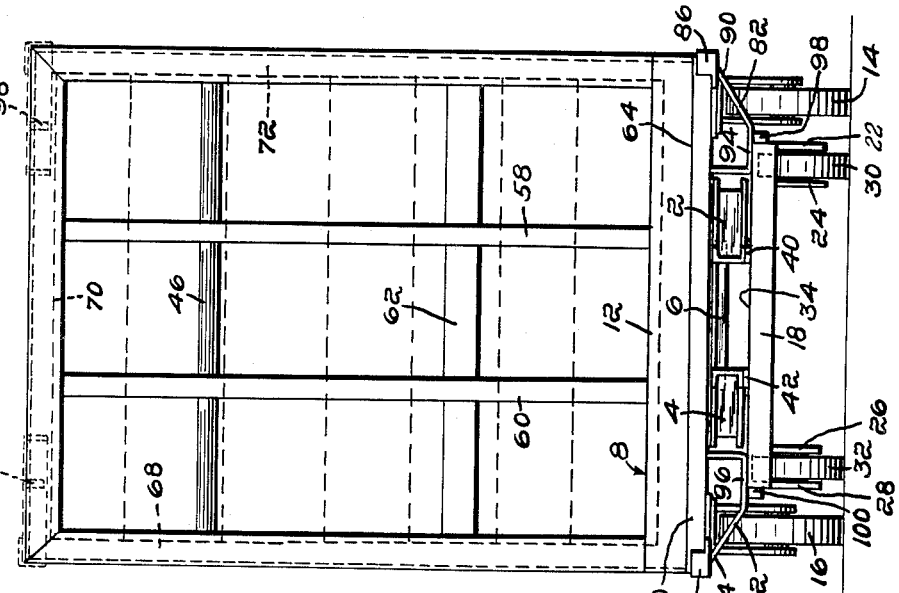
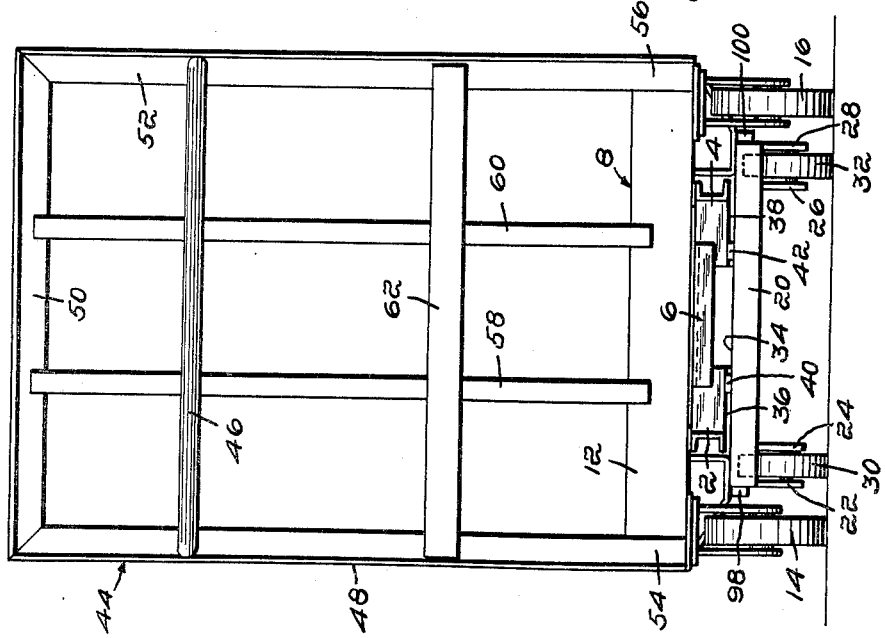
Inventor:
Americo Frank Garbarino,
by Porter, Chittick & Russell
Attorneys 3,027,174
NESTING PLATFORM TRUCKS
Americo Frank Garbarino, West Acton, Mass., assignor to Lewis-Shepard Company, Watertown, Mass., a corporation of Massachusetts
Filed Sept. 27, 1960, Ser. No. 58,689
5 Claims. (Cl. 280—33.99)

This invention relates to platform trucks and is particularly concerned with the hand-pushed type of truck which is used in moving goods over relatively short distances. Such trucks are often used in substantial numbers at loading stations and when idle they occupy a substantial amount of space that might be put to better advantage.

Accordingly, one of the principal objects of the present invention is to provide a platform truck which, when not in use, may be nested closely with other trucks so that the required space during periods of non-use may be greatly reduced.

Nesting platform trucks are old and well known in the art, but the prior constructions of which I am aware have certain disabilities and disadvantages which I believe my truck substantially overcomes.

In platform trucks of the type disclosed herein, it is customary to have a relatively high vertical wall or fence-like framework at the rear end thereof. On this wall or framework is mounted a handle which the operator may grasp for pulling or pushing purposes. The wall also acts as a barrier against which articles piled on the truck platform may be placed for greater security during movement.

In order to nest these trucks, it is essential that the wheels at one end of a given truck be spaced sufficiently close together to pass between the wheels at the other end of a similar truck as the trucks are brought together. Heretofore, when the platform of such a truck has been in horizontal position, the forward end thereof has thus had to rest on a relatively narrow base. The result has been that when heavy goods have been piled unevenly on the platform, particularly at the forward corners, a wrenching or twisting action has developed which has put heavy strains on the tapered framework, causing looseness and play to develop after relatively short periods of use. Accordingly, another principal object of my invention is to provide a base frame and platform construction which will adequately support the outer forward corners of the platform under substantial loads without distortion or damage to the base frame, while at the same time allowing the fabrication of the platform and attached elements in a way not affecting the nesting capacity of two or more such trucks.

A further object of the present invention is to provide a simplified form of construction at the rear end of the truck which will permit the use of heavy, relatively large, castered wheels, and serve simultaneously as a rigid supporting element for the platform hinged thereto, adequate anchorage and support for the rear vertical wall or fence framework, and securing means for the platform when it is in up-ended position.

Other objects of this invention will appear from the following detailed description of one presently-preferred embodiment thereof, as shown in the accompanying drawings, in which:

FIG. 1 is a plan view of two partially nested trucks, the truck at the right having its platform in vertical position and the truck at the left having its platform in horizontal position and with part of the platform broken away for better understanding of the construction;

FIG. 2 is a side elevation of three trucks in nested position in which the truck at the left has its platform still in horizontal position;

FIG. 3 is an end vertical elevation of the rear of the truck;

FIG. 4 is an end vertical elevation of the front of the truck.

In the following description, a single platform truck will first be described and then the manner in which these trucks may be nested will be explained. Referring to the several figures, each truck comprises a tapered frame composed of a pair of channel bars or members 2, 4 lying horizontally in the same plane and converging forwardly. The said channel bars or members 2, 4 are fixed in position with respect to each other by a cross brace or member 6 not far from the narrow end of their taper, and by a transversely extending angle iron or transverse member 8 of relatively heavy material, at the wide end. The attachment of the several parts is preferably by welding, although it will be understood that riveting or bolting can be used.

The horizontal portion of the angle iron or transverse member 8 is indicated at 10 and the vertical portion thereof at 12. At its respective outer ends are mounted a pair of castered wheels 14, 16. These wheels 14, 16 and their supports are made adequate to carry the intended loads.

At the narrow end of the tapered channel bars or members 2, 4 and welded to the undersides thereof are two parallel, transversely-extending channel beams or cross members 18, 20. From each pair of the adjacent ends of the said beams or cross members 18, 20 depends a pair of wheel support forks 22, 24, 26, 28, which, by means of suitable axles, carry wheels 30, 32. It should be noted that the channel beams or cross members 18, 20 have their upper surfaces as at 34 (see FIGS. 3 and 4) at a level which is appreciably below respective undersides 36, 38 of the channel bars or converging members 2, 4. This is accomplished by the introduction of respective clearance means or pieces 40, 42 between the said bars or converging members 2, 4, on the one hand, and the respective crosswise beams or members 18, 20, on the other. This arrangement is essential in order to enable the cross members 18, 20 of a second truck to slide in under the longitudinal channel bars or converging members 2, 4 of the first truck.

Attached to the vertical portion 12 of the angle iron or transverse member 8 at the rear of the truck is a wall or framework 44 to which is affixed a handle 46. The framework 44 can be made and positioned in any convenient manner, but in the form shown it comprises a plurality of channel members 48, 50, 52 welded at 54 and 56 to the rear of the vertical portion 12. A plurality of cross bars 58, 60, 62, all welded together, serve to provide a sufficient end barrier support for articles that may be loaded on the truck.

A platform 64 on the truck is best shown in FIGS. 1 and 2. It comprises a plurality of parallel boards 66 which are bound together about their periphery by four suitably-sized channel bands 68, 70, 72, 74. The rear channel band 74 has welded thereto a plurality of pipe sections 76 which are staggered thereon with respect to other pipe sections 78 which are welded to the front edge of the portion 10 of the angle iron or transverse member 8. These pipe sections 76, 78, when aligned, are adapted to receive a rod 80 which passes therethrough to form what is in effect a piano-type hinge. The two outermost of the pipe sections 76, 78 may be sealed at their respective outer ends to prevent the escape of the rod 80.

From the explanation thus far, it is apparent that the platform 64 may be swung upwardly from a stable, generally horizontal, position, shown in the lefthand truck of FIG. 2, to a stable, generally vertical, position, shown in the two righthand trucks of FIG. 2. The width of the horizontal portion 10 of the angle iron or transverse member 8 is made sufficiently great so that the center of gravity of the platform 64 will be far enough toward the framework 44 from the hinged edge of the said angle iron or transverse member 8 so that the platform 64 will remain in up-ended position without requiring any further latching means.

The novel construction whereby the outer front corner regions of the platform 64 are supported by the cross members 18, 20 will now be explained. Referring to FIG. 4, it will be noted that the platform 64 has secured to the underside of its front outer corner regions a pair of specially-designed supports 82, 84. These supports are attached to the two outer corner regions of the platform 64 formed by the channel bands 68, 70, 72 by respective corner pieces 86, 88 which are welded to the said channel bands 68, 70, 72 and from which depend broad strong metal strips 90, 92, the configuration of which can be plainly seen in FIG. 4. Flat bottom portions 94, 96 of the said strips 90, 92 rest directly on the ends of the upper surface of the cross member 18 and act to extend the supporting effect of the said cross member 18 outwardly to the front corner regions of the platform 64.

In order to prevent lateral shifting of the front end of the platform 64 with respect to the cross members 18, 20, a pair of stops 98, 100 are provided, which are welded to the respective undersides of the flat portions 94, 96 of the supports 82, 84. Thus when the truck is moved about with a load thereon, any lateral shifting of the front end of the platform is prevented and the over-all structural arrangement gives very substantial rigidity to the entire truck.

When the nesting is to be carried out, the platform 64 is swung by hand to the vertical position shown in FIG. 2. This can be done without any unlatching from the said horizontal position or latching at the said vertical position. With the platform in vertical position, the truck may then be pushed forward so that its cross beams or members 18, 20 pass under the channel bars or converging members 2, 4 of an adjacent truck and its wheels 30, 32 pass between the wheels 14, 18 of the other truck. This nesting movement continues until the forward ends of the channel bars 2, 4 engage the rear face of the cross brace or member 6 of the second truck. The said cross brace or member 6 is so placed that, at this point, the channel bars or converging members 2, 4 of the entering truck will substantially abut the channel bars or converging member 2, 4 of the receiving truck. Three such trucks can thus be nested, for example, in the relatively small space indicated in FIG. 2 and, of course, greater numbers of such trucks in spaces proportionately greater.

I realize that modifications and alternative embodiments of my invention as herein disclosed will now become apparent to those skilled in the art to which it pertains. For example, one side of my truck can be adapted to run on a track, the other side being supported by the wheels 14, 30 described, or by other vehicular means such as, but not limited to, skis, treads, balloons, fins or pontoons. Or a free side of the truck may be made to follow a moving path with the other side resting on a pivot or a moving conveyor belt. The framework 44 can be made so much shorter than the length of the platform 64 that, when the latter is up-ended, the plumb line from its center of gravity falls outside the base frame of the truck; this will remain a stable position for the said platform 64, of course, as long as the plumb line from the center of gravity of the platform truck as a whole falls within the horizontal perimeter defined by the lowest points on the wheels 14, 16, 30, 32, or on alternative vehicular supporting means. A single support suitably extended to avoid the channel bars or converging members 2, 4 can replace the presently-preferred two supports 82, 84. The channel bars or converging members 2, 4 themselves can be replaced with non-channel converging members. The stops 98, 100 could, of course, be placed on the cross beams or members 18, 20, or on one of them, or elsewhere on the base frame, instead of on the platform 64. And a single stop, particularly appropriate for, but not limited to, the instance of the pivoting embodiment mentioned above, where centrifugal forces would be a problem, can be used instead of the two stops 98, 100.

It is to be understood, therefore, that the foregoing language is not to be construed as limiting my invention, but that on the contrary it may be practiced broadly within the full scope of the appended claims.

I claim:

1. A nesting platform truck, comprising: two longitudinally-converging members; a transverse member; means securing the said transverse member to the respective tops of the widely-spaced ends of the said converging members so that its lower surface is positioned higher than the upper surfaces of the said converging members; a cross member; means securing the said cross member to the respective undersides of a the said converging members at their narrowly-spaced ends so that its upper surface is positioned lower than the lower surfaces of the said converging members; a platform supported by the said converging, transverse, and cross members; a hinge connecting the said platform swingably to the said transverse member; means operatively associated with the said transverse member limiting the swinging movement of the said platform beyond the vertical; means supporting two corner regions of the said platform on the ends of the said cross member when the said platform is in substantially horizontal position; means preventing lateral movement of the ends of the said platform with respect to the said cross member; and vehicular support means mounted on the ends of the said transverse member and on the ends of the said cross member, the length of the said cross member with its vehicular support means when the latter are in operating position being less than the distance between the vertical support means on the ends of the said transverse member.

2. A nesting platform truck as defined in claim 1, further characterized by a rigid base frame comprising the said converging and cross members, and completed by the said transverse member.

3. A nesting platform truck as defined in claim 1, further characterized by means providing a substantially vertical position of stability for the said platform, for purposes of nesting at least two such trucks together, comprising: the said hinge, horizontally oriented and positioned by the said transverse member a predetermined horizontal distance from the said means limiting the swinging movement of the said platform; and the said limiting means being so positioned that it prevents rotation of the said platform past a predetermined point of arc, and when said platform is at that said point of arc, a plumb line from the center of gravity of the said platform falls a horizontal distance from the said hinge in the direction of the said limiting means.

4. A nesting platform truck as defined in claim 1, wherein the said means limiting the swinging movement of said platform is supported by the said transverse member, and serves also as an end barrier to loads carried by the said platform.

5. A nesting platform truck as defined in claim 4, wherein the said end barrier means is a substantially vertical framework.

References Cited in the file of this patent

UNITED STATES PATENTS

| | | |
|---|---|---|
| 1,175,312 | Simpson | Mar. 14, 1916 |
| 1,941,340 | Dellert | Dec. 26, 1933 |
| 2,590,048 | Sides | Mar. 18, 1952 |
| 2,596,686 | Hess | May 13, 1952 |
| 2,639,161 | Goldman | May 19, 1953 |
| 2,738,201 | Spears | Mar. 13, 1956 |
| 2,882,062 | Hoedinghaus et al. | Apr. 14, 1959 |